(No Model.)
O. H. & W. M. JEWELL.
FILTER.
No. 593,666. Patented Nov. 16, 1897.
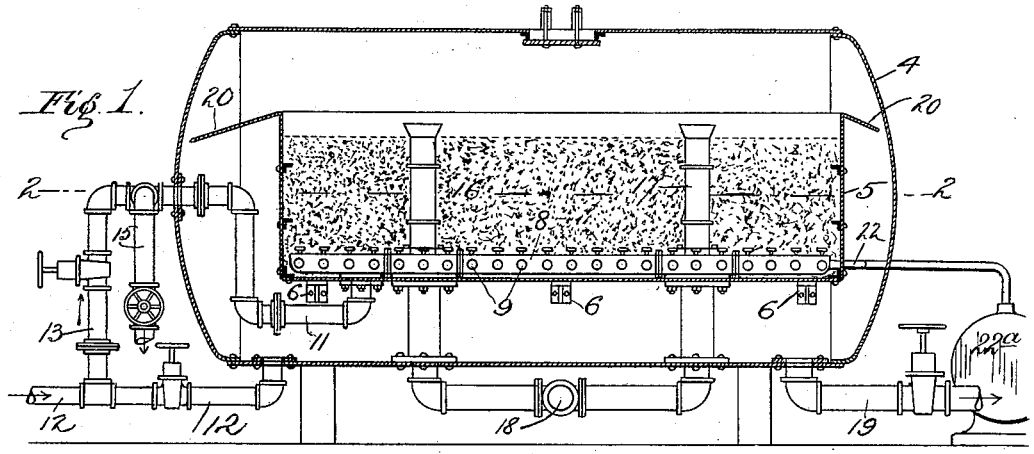
Fig. 1.
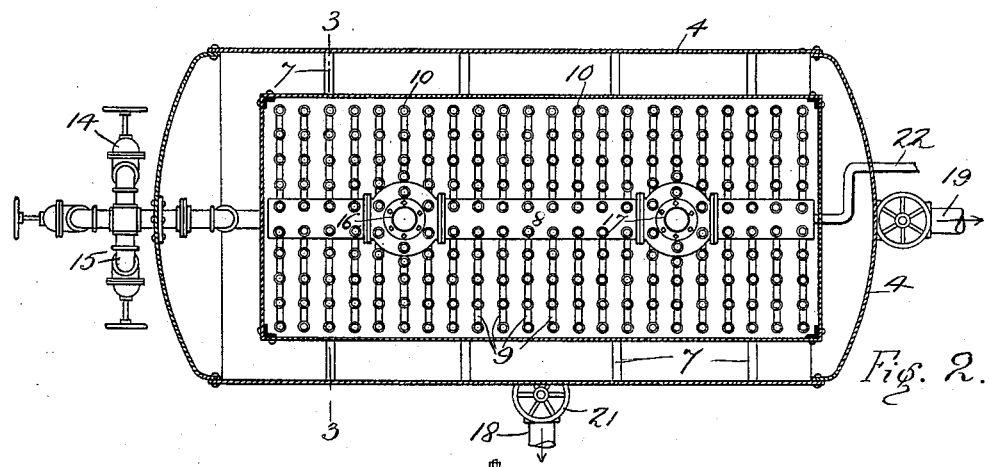
Fig. 2.
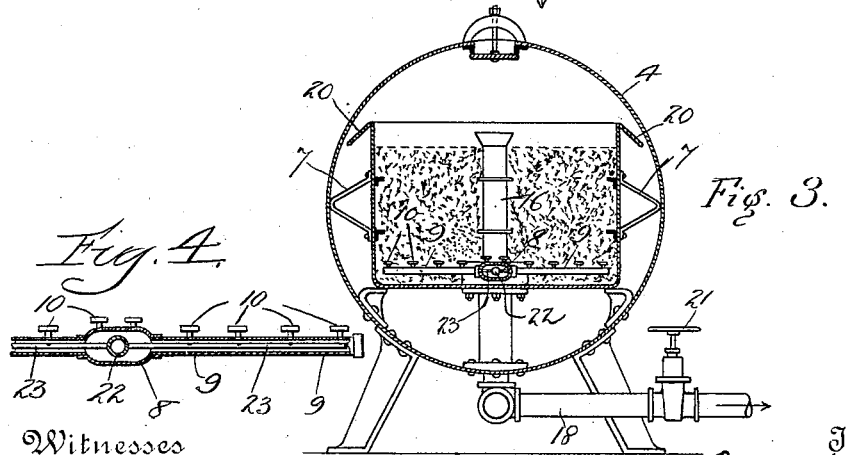
Fig. 3.
Fig. 4.
Witnesses
Walter Wagner
Wm. F. Hanning
Inventors.
Omar H. Jewell
William M. Jewell
By their Attorneys
Bond Adams Pickard Jackson.
THE NORRIS PETERS CO., PHOTO-LITHO., WASHINGTON, D. C.

UNITED STATES PATENT OFFICE.

OMAR H. JEWELL AND WILLIAM M. JEWELL, OF CHICAGO, ILLINOIS, ASSIGNORS TO THE O. H. JEWELL FILTER COMPANY, OF SAME PLACE.

FILTER.

SPECIFICATION forming part of Letters Patent No. 593,666, dated November 16, 1897.

Application filed May 16, 1896. Serial No. 591,813. (No model.)

*To all whom it may concern:*

Be it known that we, OMAR H. JEWELL and WILLIAM M. JEWELL, citizens of the United States, residing at Chicago, in the county of Cook and State of Illinois, have invented certain new and useful Improvements in Filters, of which the following is a specification, reference being had to the accompanying drawings, in which—

Figure 1 is a longitudinal vertical section. Fig. 2 is a horizontal section on line 2 2 of Fig. 1. Fig. 3 is a vertical cross-section on line 3 3 of Fig. 2, and Fig. 4 is a partial vertical section of the manifold and two of the branch pipes.

Our invention relates to filters designed to filter comparatively large quantities of water, such as are commonly used in connection with plants for furnishing water to cities, towns, and villages.

The objects of our invention are to provide improved means for agitating the filter-bed for washing purposes, to provide certain improvements in filters of this class by which the washing of the filter bed and tanks may be more thoroughly and expeditiously done, and to provide certain other improvements which will be hereinafter pointed out.

That which we regard as new will be set forth in the claims.

In the drawings, 4 indicates the external closed tank, which, as shown in Fig. 3, is cylindrical in form, its ends being concave, as shown in Figs. 1 and 2.

5 indicates a filter-tank which is adapted to contain a filter-bed, of suitable material, such as quartz. As shown in Fig. 1, the filter-tank 5 is supported a considerable distance above the bottom of the cylinder 4, thereby forming a subsiding-chamber. For supporting the filter-tank 5 cross-bars 6 are provided under said tank, and at the sides thereof are provided braces 7, as shown in Fig. 3.

8 indicates the manifold, having branch pipes 9, carrying strainers 10 in the usual manner.

11 indicates a pipe communicating with the manifold 8, through which the pure water is conducted from the manifold and the wash-water introduced into it.

12 indicates the inlet water-pipe, which opens into the bottom of the outer tank 4, as shown in Fig. 1.

13 indicates a pipe connecting the pipe 12 with the pipe 11 for introducing wash-water into the filter.

14 indicates a pipe which communicates with the pipe 11 and serves to conduct filtered water from the filter.

15 indicates a pipe which also communicates with the pipe 11 and serves to conduct the water first filtered after washing from the filter. The pipes 13 14 15 are provided with suitable valves in the usual manner.

16 17 indicate overflow-pipes opening into the filter-tank 5 above the bed of filtering material, which pipes serve to conduct away the wash-water while the filter is being washed. The pipes 16 17 communicate with the main 18, which discharges into the sewer.

19 indicates a pipe which opens into the bottom of the tank 4 and serves to conduct off the impure water resulting from the washing of the tank 4.

As best shown in Figs. 2 and 3, the filter-tank 5 is substantially rectangular in shape, and as the outer tank 4 is cylindrical considerable space is provided around the filter-tank on all sides. At its upper edges the tank 5 is provided with deflectors 20, extending almost to the walls of the outer tank 4 on all sides, as illustrated in the drawings. The deflectors 20 operate, when washing the filter, to discharge the wash-water which overflows from the tank 5 against the walls of the external tank 4, and, owing to the arrangement of the two tanks, the accumulated sediment and other impurities are readily dislodged and carried off through the pipe 19. The circular form of the external tank greatly facilitates the dislodgment of such impurities, and by making the internal tank rectangular greater space is provided, so that a greater volume of water may be used and the impurities more efficiently attacked. When washing the external tank, the pipe 18, which is connected with the overflow-pipes 16 17, is closed by a valve 21.

22 indicates a pipe arranged within the manifold 8 and having branch pipes 23, which extend into the branch pipes 9. As best shown in Fig. 2, the pipe 22 extends through one end of the filter-tank and is connected to a compressor 22ª of any suitable construction for supplying air, steam, or other suitable gas. The branch pipes 23 are provided with perforations arranged under the strainers 10 for discharging the air or gas into said strainers. The object of this construction is to provide for forcing a blast of air or other gas upward into the filter-bed with the wash-water, thereby agitating the quartz or other material composing the filter-bed and thus enabling the water to wash it thoroughly. In use the blast of air is under somewhat greater pressure than the wash-water. This apparatus is particularly advantageous in many filters where it is difficult or practically impossible to use mechanical devices for agitating the bed. In such cases the method described will be employed. It could, however, be employed in connection with mechanical agitating devices, if so desired.

In operation the water to be filtered enters, through pipe 12, the external tank 4, which acts as a subsiding-chamber. When the water in the external tank rises high enough to overflow the edges of the internal tank 5, the water passes into the latter tank and down through the filter-bed and is carried off through pipes 11 and 14, the valves being properly arranged for that purpose. During the operation of filtering, the valve 21 in the main 18 is closed, so that the water to be filtered cannot escape through the overflow-pipes 16 and 17. In washing the filter the valves are so arranged that the water enters through pipes 12, 13, and 11 to the manifold 8, thence upward through the filter-bed, the wash-water being carried off through the vertical pipes 16 and 17 to the main 18, the valve 21 being opened for that purpose. When it is desired to wash out the external tank 4, the valve 21 in the main 18 is closed, so that the wash-water cannot escape through the overflow-pipes 16 17. Consequently it is caused to overflow the internal tank and is directed against the sides and ends of the external tank by the deflectors 20 and escapes from said tank through the pipe 19.

We have described in detail the construction of our improved filter, but we do not limit ourselves to such specific details, as they may be varied without departing from the spirit of our invention.

That which we claim as our invention, and desire to secure by Letters Patent, is—

1. In a filter, the combination with an external tank, of an internal filter-tank arranged therein and adapted to contain the filter-bed, means for causing a flow of water upward through said filter-tank and over the edges thereof, and means for directing the overflowing water away from the sides of said tank, substantially as described.

2. In a filter, the combination with an external tank having a concave bottom, of an internal filter-tank arranged therein and adapted to contain the filter-bed, means for causing a flow of water upward through said filter-tank and over the edges thereof, and means for directing the overflowing water away from the sides of said tank, substantially as described.

3. In a filter, the combination with an external tank having a concave bottom, of an internal filter-tank arranged therein and supported above the bottom thereof, said internal tank being arranged to contain the filter-bed, means for causing a flow of water upward through said filter-tank and over the edges thereof, and means for directing the overflowing water away from the sides of said internal tank, substantially as described.

4. In a filter, the combination with a horizontal, cylindrical external tank, of an internal tank arranged therein and supported above the bottom thereof, said filter-tank being adapted to contain the filter-bed, means for causing a flow of water upward through said filter-tank and over the edges thereof, and means for directing the overflowing water away from the sides of said internal tank and against the sides of the external tank, substantially as described.

5. In a filter, the combination with a filter-tank, of a manifold therein, branch pipes connected to said manifold, an air-pipe in said manifold and having branches extending into said branch pipes, discharge-orifices in said branch pipes, and means for supplying gas under pressure to said air-pipe, substantially as described.

6. In a filter, the combination with an external tank, and an internal tank arranged therein, of one or more overflow wash-pipes opening into said filter-tank below the upper edges thereof, and means for closing said overflow pipe or pipes to cause the wash-water to overflow the internal tank, substantially as described.

7. In a filter, the combination with a cylindrical tank, of a filter-tank arranged therein and adapted to contain the filter-bed, means for directing the flow of water upward through said filter-tank and over the edges thereof for washing the external tank, and one or more deflectors carried by said filter-tank for discharging the wash-water against the wall or walls of said cylindrical tank, substantially as described.

8. In a filter, the combination with a filter-tank adapted to contain a filter-bed, of pipes having a series of discharge-orifices under said filter-bed for introducing water under pressure into the lower part of said filter-bed, and a series of jet-openings arranged in said pipes coincident with said discharge-orifices for injecting gaseous blasts through the orifices, substantially as described.

OMAR H. JEWELL.
WILLIAM M. JEWELL.

Witnesses:
JOHN L. JACKSON,
ALBERT H. ADAMS.